Nov. 13, 1956          A. J. KASAK          2,770,217

CEMENT APPLICATOR FOR BRAKE LINING

Filed Nov. 20, 1952          4 Sheets-Sheet 1

INVENTOR.
ANTONIN J. KASAK
BY
H. O. Clayton
ATTORNEY

Nov. 13, 1956  A. J. KASAK  2,770,217
CEMENT APPLICATOR FOR BRAKE LINING
Filed Nov. 20, 1952  4 Sheets-Sheet 2
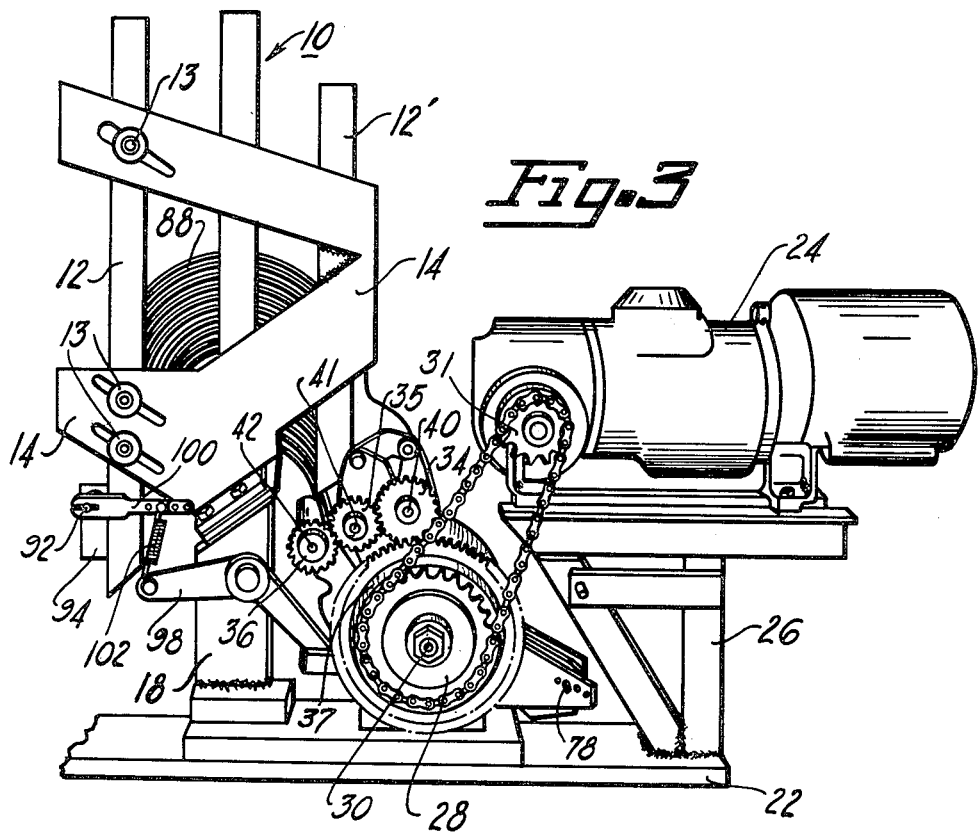
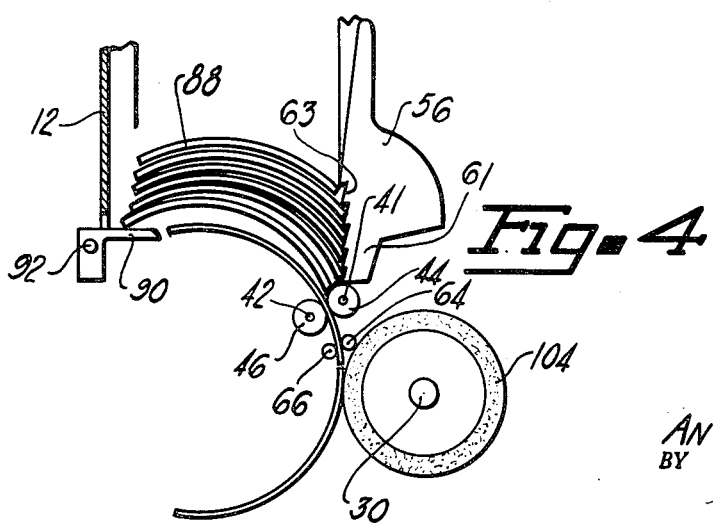
INVENTOR.
ANTONIN J. KASAK
BY H. O. Clayton
ATTORNEY Nov. 13, 1956

A. J. KASAK 2,770,217

CEMENT APPLICATOR FOR BRAKE LINING

Filed Nov. 20, 1952

INVENTOR.
ANTONIN J. KASAK
BY
H. O. Clayton
ATTORNEY

Nov. 13, 1956  A. J. KASAK  2,770,217
CEMENT APPLICATOR FOR BRAKE LINING
Filed Nov. 20, 1952  4 Sheets-Sheet 4

INVENTOR.
ANTONIN J. KASAK
BY
ATTORNEY

United States Patent Office 2,770,217
Patented Nov. 13, 1956

2,770,217

CEMENT APPLICATOR FOR BRAKE LINING

Antonin J. Kasak, South Bend, Ind., assignor to Bendix Aviation Corporation, South Bend, Ind., a corporation of Delaware Application November 20, 1952, Serial No. 321,636

6 Claims. (Cl. 118—410)

This invention relates to machines for applying adhesive to brake lining of the brake shoes of an automotive vehicle.

It is an object of my invention to provide a simple and effective machine of relatively few parts, for quickly applying an adhesive to the underside of the brake lining element of the brake shoe said element being, with this operation, prepared for its subsequent combination, by a curing and bonding process, with a brake shoe body element to provide the complete brake shoe.

One of the important objects of my invention is to provide a machine of the above type wherein adhesive is extruded from a nozzle element of a particular design onto the underside of the lining over the full width or required part of it.

Yet another object of my invention is to provide a machine including parts adjustable to make possible the processing of lining elements of different lengths, different widths, different thicknesses and different curvatures.

A further object of my invention is to provide a machine of the aforementioned type operable to align the several pieces of brake lining which are fed into the hopper of the machine and also operable to feed the lining to the nozzle element at the proper speed and time.

The above and other objects and features of the invention will appear more fully hereinafter from a consideration of the following description taken in connection with the accompanying drawings where one embodiment of the invention is illustrated by way of example.

Figure 3 is a view disclosing the other side of the machine of Figure 1;

Figure 4 is a view, in large measure diagrammatic and looking in from the side of the machine of Figure 3, disclosing a part of the mechanism operable to align and feed the lining to the extrusion nozzle;

Figure 5:
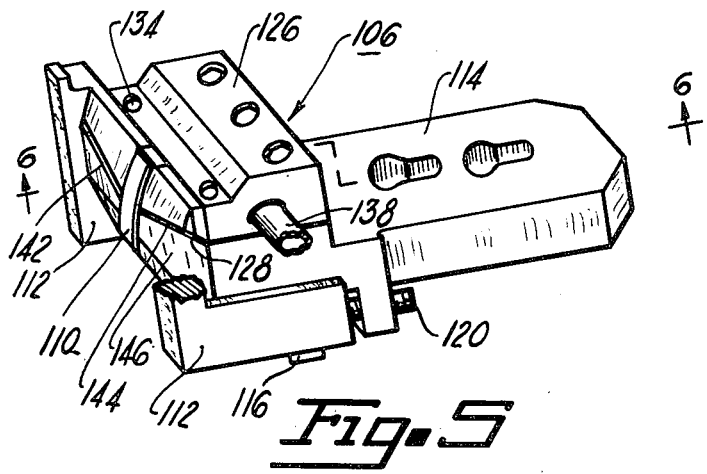
Figure 6:
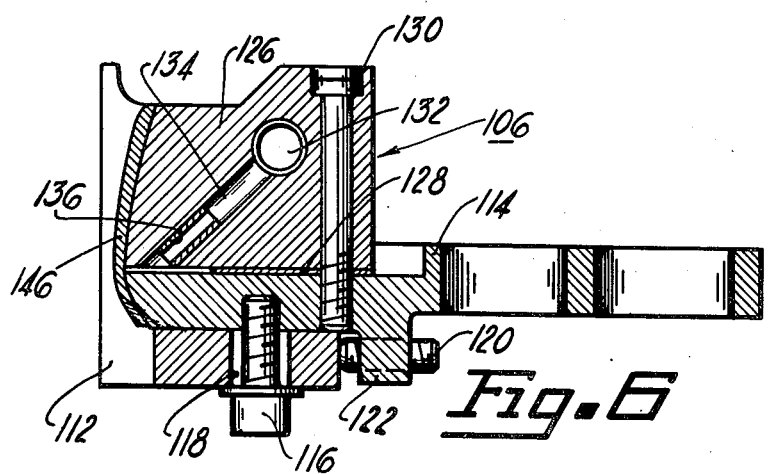
Figure 7:
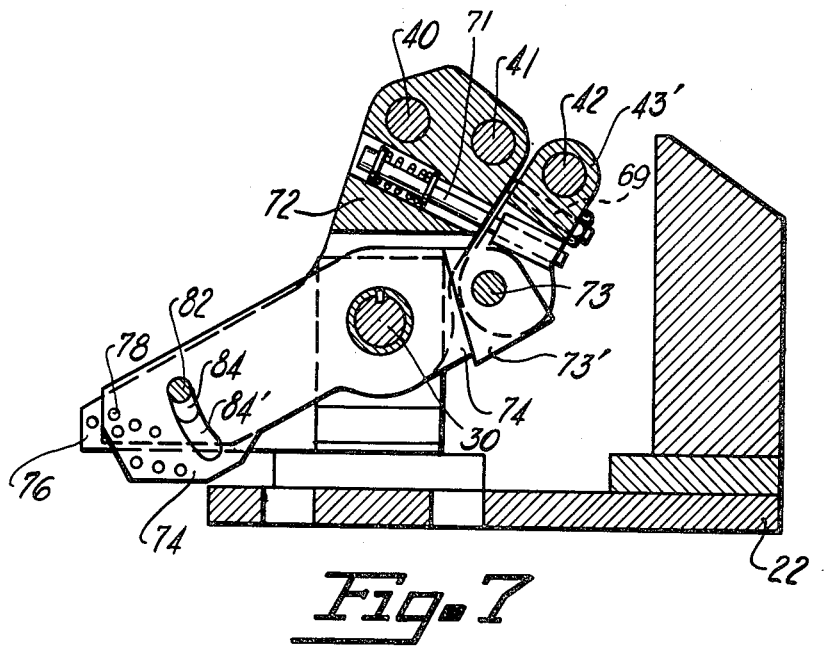

Figure 5 discloses the adhesive nozzle element of my invention;

Figure 6 is a sectional view, taken on the line 6—6 of Figure 5, disclosing certain details of the nozzle element;

Figure 7 is a view, partly in section disclosing details of the means for adjusting the curvature and thickness required by the position of the eccentric 43' and the rollers 41, 42 which move aligning levers 72, 74 in line with 76 of the mechanism of my invention.

Figure 8:
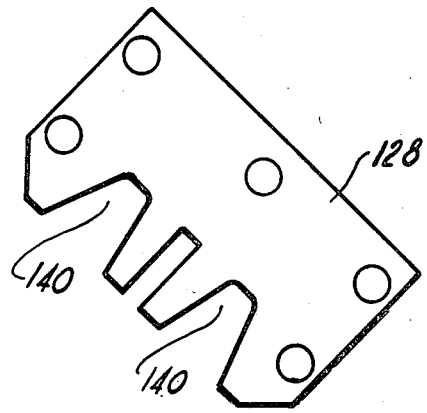

Figure 8 is a view of the adhesive gauging spacer of the nozzle element; and

Figure 9:
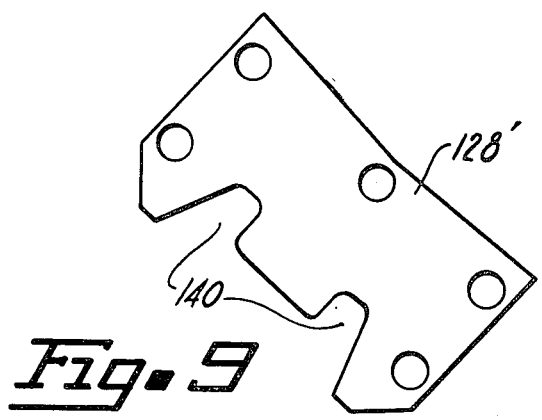

Figure 9 discloses another embodiment of gauging spacer.

There is disclosed in Figures 1 to 4 inclusive a preferred embodiment of the machine constituting my invention including a brake lining receiving box shaped hopper 10 rectangular shaped in cross section said hopper comprising angular shaped vertically extending end members 12 and 12'. The two members 12 are adjustably secured, by fastening members 13, to body members 14 and 16. As is disclosed in these four figures of the drawing the adjustable securement of the members 12 to the members 14 and 16 provide a means for sizing the hopper to the particular length of brake lining to be housed therein.

The hopper 10 is fixedly mounted upon a standard 18 which is fixedly mounted on a base member 22. A source of power, preferably a variable speed electric motor 24, is mounted upon a support 26 which is also secured to the base member 22. As disclosed in Figure 3 a gear member 28, rotatably mounted upon a drive shaft 30, is drivably connected, by a chain and sprocket mechanism 31, to the motor 24; and the gear 28 serves to drive intermeshed pinion gears 34, 35 and 36 through the medium of a friction clutch 37. As will be described hereinafter the gears 35 and 36 are relatively fixed in place the gear 36 being bodily movable away from and toward the gear 35 to make possible an adjustment for lining thickness; accordingly the teeth of gears 35 and 36 are of sufficient length to make this lining thickness adjustment possible.

Gears 34 and 35 of the gear train serve respectively, through the intermediary of drive shafts 40 and 41 connected thereto, to rotate an eccentric 43 and a roller 44 the eccentric being drivably connected to the shaft 40. The pinion 36 is drivably connected to a rotatable shaft 42 which is journalled in a bearing block, Figure 7; and upon one end of said shaft there is connected a roller 46. The eccentric 43 is pivotally connected to a link 54 which is pivotally connected at its upper end to one arm to a bell crank lever 56. The latter lever is pivotally connected to a fixed member 60 and, as disclosed in Figure 4, has secured thereto a lever projection 61 extending downwardly and within the outline of the hopper. The innerface of the lever 56 is saw-tooth in outline at 63 to provide surfaces to momentarily support the ends of the pieces of brake lining; and as the lever 56 is oscillated, that is rocked about its pivot 60, each piece of brake lining with an intermittent movement drops, by the force of gravity, from one saw tooth surface to another until it reaches the spaced rollers 44 and 46. The chain and sprocket drive 31, the friction clutch 37, the gear train 34, 35, 36 and gear 28, the shafts 40, 41 and 42 and other parts of the mechanism are housed within a casing 62 to protect the same from dust and dirt said casing being disclosed in Figure 2.

As disclosed in Figure 2 immediately below the driving rollers 44 and 46 are mounted idler guide rollers 64 and 66 on plates 68 nested in a guide member secured to a plate 72 and held by a screw 70 positioning the roller 64 with respect to roller 66 to suit the width of the lining 88. Plate 72 and a plate 74 are pivotally mounted on the shaft 30 as disclosed in Figure 7. The bearing block 43' is rotatably mounted upon a shaft 73 which is journalled in a boss portion 73' said boss extending from one end of the plate 74. The shaft 30 is journalled in bearing members not shown, which are fixedly secured in place. As disclosed in Figure 7 the block 43' is yieldingly and adjustably connected to the plate 72 by a pin 71 and a set screw 69.

Discussing now in greater detail the lining curvature adjusting mechanism disclosed in Figure 7, the aforementioned plate 72, serving as a mounting for the shafts 40 and 41, and the plate 74, serving as a mounting for the shaft 73, are, as described above, pivotally mounted on the shaft 30. The plates 72 and 74 lie in face to face contact with each other and the two are adjustably mounted in face to face contact with a plate 76 which is permanently fixed to the base member 22. The plates 72 and 74, which are angularly and separately movable about the shaft 30, are selectively adjusted to the fixed plate 76 by a pin 78 which extends through aligned openings in the three plates. A stud 82, secured to the plate 76 and extending through aligned slots 84 and 84' in the plates 72 and 74 respectively, serves to hold the plates 72 and 74 in the desired position by means of a nut 86, Figure 1.

There is thus provided, by the adjustable plates 72 and 74, means for adjusting the rollers 44 and 46 with respect to a guide roller 104 rotatably mounted on the shaft 30; and by the same operation position the rollers 64 and 66 with respect to the roller 104 it being noted that in this adjusting operation the rollers follow the great circle on the diameter of the lining 88. It is also to be noted that the roller 46 may, at any time and by the operation of the set screw 69, be spaced a greater distance from the roller 44. There is also provided, by the adjustment of the plates 68, an adjustment for guide rollers 64 and 66; and an adjustment of the bell crank lever 56 by the adjustment of the plate 72. The rollers 44 and 46 are, by virtue of the spring surrounding the pin 71, under spring tension; and their surface speed is greater than the surface speed of the large roller 104 to assure continuity when one lining is approaching and the other going away from the extrusion nozzle described hereinafter.

Describing now the complete operation of the mechanism of my invention, and incidently completing the description of parts not heretofore described, the operator of the machine feeds the lining, indicated by the reference numeral 88, and into the hopper 10; and the nested pieces of lining come to rest upon a bell crank lever shaped feeder member 90, Figure 4, and the uppermost tooth of the teeth 63 of lever 56. The member 90 is fixedly mounted upon a shaft 92 which is journalled in a bearing constituting the upper end of a standard 94, Figure 1. The shaft 92 is rotated, first in one direction and the other, by driving means driven by a cam, not shown, rotating with shaft 30. This driving means includes a bell crank lever 98, a crank 100, and a spring 102 the latter interconnecting the lever 98 and crank 100.

As is made evident by an inspection of Figure 4 of the drawing simultaneous angular movement of the levers 90 and 56 serving as feeder mechanism, results in the desired feeding of the lining into the space between driven rollers 44 and 46. These rollers, which are preferably faced with a friction material such as a rubberized fabric, are driven in opposite direction and serve to pull each lining member downwardly, the lower end thereof entering the space between the idler guide rollers 64 and 66.

At this juncture it is to be again noted that the rollers 44 and 46 are so positioned with respect to the roller 104 and to each other, and the rollers 64 and 66 are so spaced and so positioned with respect to the rollers 44 and 46, as to accommodate the circle diameter of the particular lining being processed.

In other words the rollers are adjusted to handle lining of a given curvature. For example, the rollers 46, 44, 64 and 66 will be moved to the right with respect to roller 104, Figure 4, to handle a lining constituting a segment of a circle of relatively large diameter; and it is to be remembered that the spacing and shape of the teeth of gears 35 and 36, Figure 3, make possible an adjustment for the thickness of the lining. The angular movement of the plate 72 controls the adjustment of the roller 44 and the eccentric 43; and it is also to be noted that the angular movement of the plate 72 about the shaft 30 changes the setting of the crank 56 thereby changing the timing of operation of the lining.

After the lining leaves the rollers 64 and 66 it comes in contact with the relatively large rubber faced master roller 104 which regulates the speed of the lining in the machine. This roller 104 is driven by the shaft 30 and presses the inner side of an extrusion lining against the nose of the nozzle 106 to receive the cement extruded therefrom.

Figure 1:
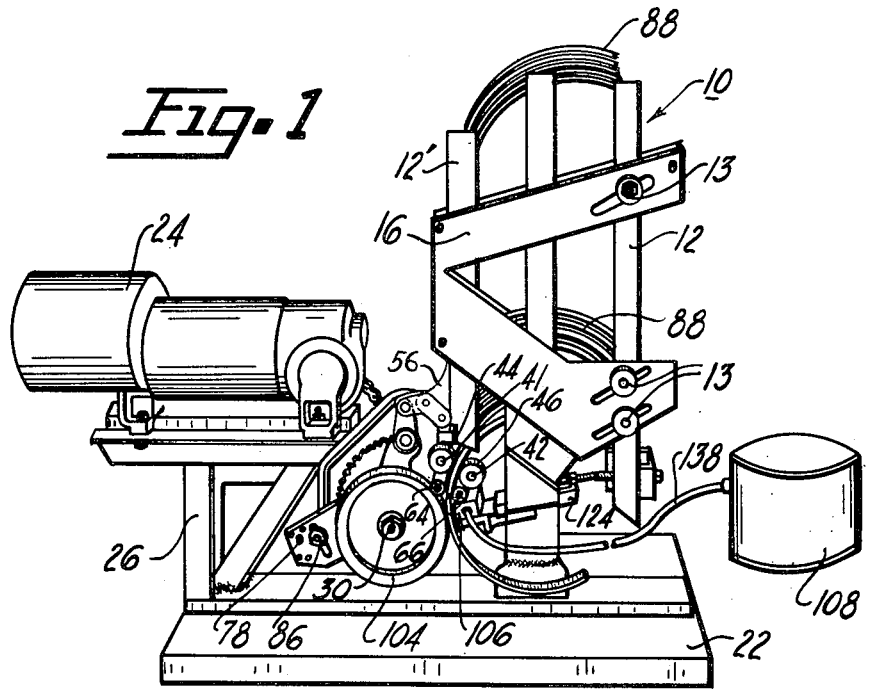
Figure 1 is a view disclosing one of the sides of the brake lining machine constituting my invention.
Figure 2:
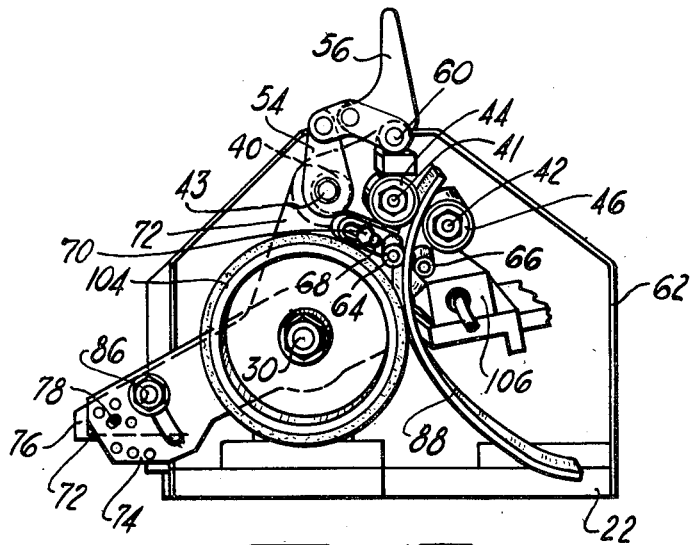
Figure 2 is a side view disclosing details of parts of the mechanism operable to feed the lining elements to the adhesive extrusion nozzle and to determine the curvature at which said elements are fed to the nozzle.

As disclosed in Figure 2 the inner-surface of each piece of brake lining is covered by suitable bonding material immediately after it passes the lip of the extrusion nozzle. This bonding or adhesive material, supplied under pressure from a source 108, Figure 1, is extruded from the extrusion nozzle unit 106, which is pressure fed from a unit 108. The inner surface of each piece of lining having been coated with the adhesive the several pieces then fall on a suitable conveyor, not shown, which transports the lining to a curing oven, not shown.

The extrusion nozzle unit 106 is disclosed in my application No. 607,240, filed August 30, 1956. Accordingly, no claim is made thereto in the instant application.

This unit includes a bed plate 114, and lining guide 110, said parts being slidably adjustable by members 120 and 116 in slots 118 to keep the nose 146 ahead of the lip of 114. The nozzle unit also includes an adhesive distributing body member 126 seated upon the bed plate 114 the two being separated by a spacer member 128; and bolts 130 secure the members 126 and 114 together. The spacer member 128 nests in V-shaped cavity which forms lips 142 and 144 of the nozzle. The gauging sectors 140 and 128 determine the size and number of extruded ribbons of adhesive to be laid on the innerside of the lining 88. The spacer member, modified as per 128', will extrude adhesive all over the width of lining 88.

The body member 126 is bored to provide a transversely extending passage 132 and two diagonally extending passages 134, said passages distributing bonding adhesive to sectors 140. Choking the tubes 136 in passages 134 serves to balance evenly the ejected adhesive from lips 142 and 144 which are formed by cavity sector or sectors 140. A conduit 138 mounted on either end of passage 132 serves to connect the nozzle to the pressurized adhesive supply unit 108, Figure 1.

Linings 88 when passing lips 142 and 144 of the nozzle are precisely guided by parallels 112 and the nose portion 146 of the member 110. Friction surfaces of this lining guide are weldplated with hard alloy to resist the abrasion of the brake lining material. It should be noted that the nose 146 reaches only from the lip openings 142 and 144 to the bottom of this "V" cavity to give full support to the lining over the "V" shaped extruding lips. This design and spacer 128', Figure 9, makes possible for the adhesive to cover in full width the innerside of the lining, or just strips of chosen width, by merely replacing the spacer 128.

The nozzle is installed in a cement applicator rest in slide 124 which is urging the nozzle by spring forces toward the innerside of the lining. This travel is limited by set screw 122 resting on member 18.

There is thus provided, by the mechanism constituting my invention, a machine well suited to coat the inner-surface of brake lining with the desired pattern and quantity of adhesive; and this machine is so adjustable as to accommodate linings of different curvature, length, width and thickness.

I claim:

1. A machine for processing pieces of brake lining whereby the inner-surface of each piece of lining is covered by a bonding adhesive, said machine including a hopper shaped to receive nested pieces of lining, a plurality of roller members, some of which are driven, positioned adjacent the hopper and contactable with each piece of lining and operative to direct the path of movement of each piece of lining in a given direction as it leaves the hopper, means mounted adjacent the hopper for feeding the lining to the roller members, means for covering each piece of lining with an adhesive as it leaves the rollers, and power means for actuating the feeder mechanism and the aforementioned driven rollers.

2. A machine for processing pieces of brake lining whereby the inner-surface of the lining is covered with a bonding adhesive, said machine including a hopper shaped to receive nested pieces of lining, a plurality of roller members, including a plurality of driven rollers and a plurality of guide rollers, operative to direct the path of movement of the lining in a given direction as it leaves the hopper all of said rollers contacting the lining during said operation, means for driving the driven rollers, means, including a plurality of driven members, for feeding the lining from the hopper to the roller members, and means for covering each piece of lining with adhesive as it leaves the rollers.

3. A machine for processing pieces of brake lining whereby the inner-surface of the lining is covered with a bonding adhesive, said machine including a hopper shaped to receive nested pieces of lining, a roller member, including a plurality of driven rollers and a plurality of guide rollers, operative to direct the path of movement of the lining in a given direction as it leaves the hopper all of said rollers contacting the lining during said operation, means including an electrical motor for driving the driven rollers, means, including a plurality of bell crank like feeder members, for feeding the lining to the roller members, and means for covering each piece of lining with an adhesive as it leaves the rollers.

4. A machine for covering the inner-surface of brake lining with an adhesive including a hopper member shaped to receive nested pieces of lining, a plurality of roller members, some of which are driven, positioned immediately beneath the hopper and serving to both move and direct the path of movement of the lining as it leaves the hopper, means, including a bell crank like member, for feeding, one at a time, the several pieces of lining to the roller members, means, including an adhesive extrusion nozzle, for covering each piece of lining with an adhesive as it leaves the rollers said nozzle being positioned immediately adjacent the roller members, and power means for actuating the rockable means and for driving the aforementioned driven rollers.

5. In a machine for covering the inner-surface of brake lining with an adhesive including a hopper member shaped to receive nested pieces of lining of a certain curvature, a plurality of rollers, some of which are driven, positioned beneath the hopper and serving to both move and direct the path of movement of the lining as it leaves the hopper, means, including a bell crank shaped lever member, for feeding the several pieces of lining to the rollers, means, including two relatively adjustable plate members, serving as a mounting for the driven rollers and as a mounting for a part of the feeding means and operative to so position the driven rollers as to enable said rollers to receive the lining being fed thereto, power means for actuating the feeder mechanism and the driven rollers, and means for covering each piece of lining with an adhesive just before it leaves the rollers.

6. A machine for covering the inner-surface of brake lining with an adhesive including a hopper member shaped to receive nested pieces of lining, a plurality of roller members, some of which are driven, positioned beneath the hopper and serving to both move and direct the path of movement of the lining as it leaves the hopper, means for feeding the several pieces of lining to the roller members, means for changing the mode of operation of a part of the feeder means and for adjusting the relative position of the several rollers, power means for actuating the feeder mechanism and the driven rollers, and an extrusion nozzle for covering each piece of lining with cement as it leaves the rollers said nozzle being adjustably positioned beneath two of the guide roller members and opposite one of the driven roller members.

References Cited in the file of this patent

UNITED STATES PATENTS

| 1,197,326 | Ackerman | Sept. 5, 1916 |
| 1,275,960 | Maynard | Aug. 13, 1918 |
| 1,330,639 | Leumann | Feb. 10, 1920 |
| 1,708,441 | Cole | Apr. 9, 1929 |
| 1,942,840 | Sheppard et al. | Jan. 9, 1934 |
| 1,957,318 | Bush | May 1, 1934 |
| 2,512,218 | Worth | June 20, 1950 |
| 2,640,695 | Nelson | June 2, 1953 |